June 18, 1940.                I. E. MUSKAT                2,204,813
DESULPHURIZATION OF IRON AND STEEL
Filed June 25, 1938
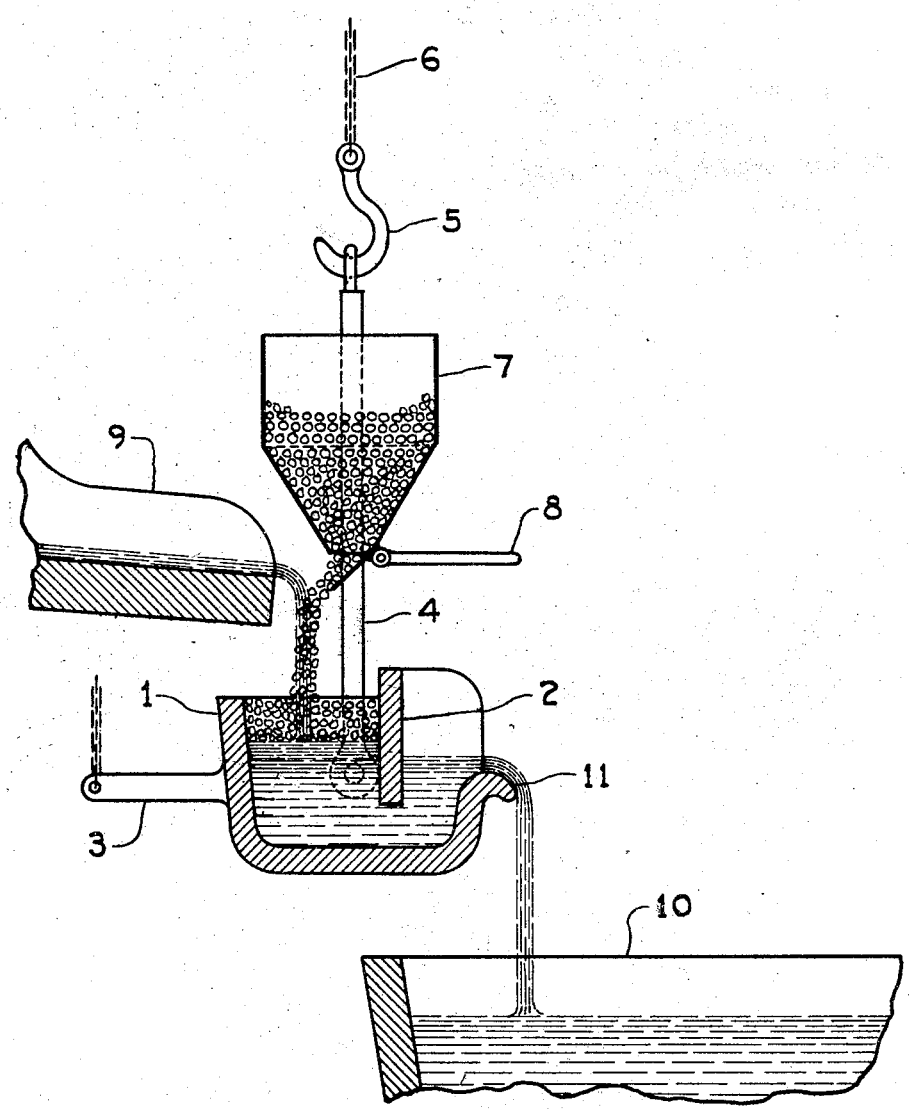
IRVING E. MUSKAT   INVENTOR.
BY Raymond S. Chisholm
ATTORNEY.

Patented June 18, 1940

2,204,813

UNITED STATES PATENT OFFICE 2,204,813

DESULPHURIZATION OF IRON AND STEEL

Irving E. Muskat, Akron, Ohio, assignor to Pittsburgh Plate Glass Company, Allegheny County, Pa., a corporation of Pennsylvania Application June 25, 1938, Serial No. 215,872

1 Claim. (Cl. 75—55)

This invention relates to improvements in refining iron and steel and is particularly directed to an effective method for desulphurizing molten iron. It is conventional to treat molten iron with various desulphurizing agents in order to remove sulphur. In accordance with one method, it has been proposed to introduce desulphurizing agents such as lime along with various other purifying agents in a melting furnace in which iron ore, pig iron, scrap iron, etc., is to be melted. In such a process, a charge of iron, purifying agents, and carbon generally is introduced in an upper portion of the furnace and molten iron and slag are separately withdrawn from a lower portion thereof. While some desulphurizing occurs in such a process, the amount of desulphurizing agent required for a given amount of iron is large and often the degree of desulphurization secured is insufficient for certain purposes. Furthermore, it is impossible to insure uniform contact between the iron and the purifying agent, and for this reason the degree of desulphurization is often nonuniform throughout the melt.

Accordingly, it is common to desulphurize molten iron after it has been removed from the furnace. In such cases desulphurizing agents are added to a molten pool of iron and a desulphurizing slag is thereby formed upon the surface of the pool which may then be skimmed off or otherwise removed. Here again, it is often difficult to secure uniform treatment since the slag rests upon the surface of the metal and uniform contact of the purifying agent with the metal is not obtained.

In accordance with my invention, I have been able to provide a method of intimately contacting a body of molten metal with suitable refining agents. I have found that a very complete removal of sulphur may be secured by withdrawing molten metal containing sulphur from a melting furnace, establishing a pool of molten desulphurizing agent and permitting the molten iron to flow through this pool. In this manner, the iron may be uniformly contacted with the desulphurizing agent in a minimum of time and a more thorough removal of sulphur may be obtained than has previously been regarded as economically feasible.

The invention will be more fully understood by reference to the following specification illustrated by the accompanying drawing in which the figure is a diagrammatic vertical, sectional view of a purifier suitable for use in desulphurizing metal in accordance with my invention.

In order to insure rapid and thorough contact of the iron with the agent, it is preferred to carry out the desulphurization using a highly fluid slag of relatively low density. I have found that the alkali metal carbonates and bicarbonates such as sodium carbonate or sodium bicarbonate are particularly effective in this process. Other similar agents such as the alkali metal cyanides, chlorides, or hydroxides may also be used in lieu of or in conjunction with the soda ash. In addition, lime or other alkaline earth metal compounds may be added to raise the melting point and increase the viscosity of the slag if desired. From time to time or continuously, a portion of the slag may be withdrawn with impurities and fresh desulphurizer added to the melt. This desulphurizer may be added in the form of a powder, in lumps or in other suitable form. In general, I prefer to add the sodium carbonate or other agent as briquettes bonded with a suitable binder, such as molasses or still residue derived from the distillation of mineral oils.

In the operation of the embodiment illustrated in the figure, we may use a suitable purifier 1, provided with a discharge lip 11 and a baffle 2 and suspended from chain 6 and hook 5 by means of a suitable bail 4. A hopper 7, provided with a discharge device 8 in a lower portion thereof, is suspended above the container and supported on bail 4 by suitable supports (not shown).

In the operation of the device, briquettes of soda ash are discharged from the hopper to the purifier as shown and a molten slag pool of substantial depth is thereby formed. Molten iron, containing sulphur, is withdrawn from a suitable source, such as a melting furnace, and discharged through spout 9 into the slag pool through which it flows and is withdrawn from under baffle 2 and discharged into a ladle or other convenient container 10. By raising or lowering handle 3, it is possible to regulate the rate of flow of iron from the purifier. Preferably the rate of flow of iron to and from the purifier is so regulated that the baffle 2 is immersed in a pool of iron whereby slag is prevented from flowing underneath the baffle and into the ladle.

Since the desulphurization occurs with rapidity, it is possible to maintain a continuous flow of molten iron through the purifier and thus, large quantities of molten iron may be treated with a minimum of soda ash in a minimum of time to obtain a maximum removal of sulphur. If necessary, the process may be repeated until the required amount of sulphur is removed. The depth of the slag pool is dependent largely upon the amount of sulphur present in the iron and the rate of flow of iron through the pool, but should be sufficient to insure a substantial removal of sulphur from the metal as it settles through the slag. The process is not limited to the use of the apparatus shown in the figure, but may be operated using other convenient means for providing a relatively deep slag pool.

The following example is illustrative of the invention:

*Example I.*—Molten iron containing 0.039% of sulphur was introduced into a purifier of the type illustrated in the figure, and soda ash briquettes bonded with a carbonaceous binder was added in sufficient amount to form a pool of slag having a depth of 24 inches. Iron was introduced into the purifier at the rate of 100 tons per hour and fresh briquettes added at the rate of 10 pounds per ton. The average sulphur content of the iron leaving the purifier was 0.008%.

This process is particularly adapted to the removal of sulphur from iron which initially is relatively low in sulphur content. Thus, a substantial reduction in the sulphur content of a melt which initially contains 0.02 to 0.04 percent of sulphur, may be secured. This sulphur may be present either in the free state or combined with the other constituents. The process is not only effective in the removal of sulphur but has the additional advantage of serving as an effective means of neutralizing and removing acid slag which may be dispersed in the molten iron. Thus, molten iron of extremely high purity may be secured in a simple manner without the extensive agitation and manipulation which has been regarded as necessary in prior art processes.

Although the present invention has been described with reference to the specific details of certain embodiments thereof, it is not intended that such details shall be regarded as limitations upon the scope of the invention except insofar as included in the accompanying claim.

I claim:

A continuous process for purifying molten iron containing sulphur which comprises establishing a pool of fluid slag containing sodium carbonate in a pivoted tilting ladle, introducing a continuous stream of molten iron containing sulphur into the upper portion of said pool thereby permitting the iron to flow through the pool, the depth of the pool being of such magnitude that the iron is substantially desulphurized as it flows therethrough, maintaining the depth of the pool by adding briquettes of sodium carbonate bonded with a binder of the group consisting of molasses and still residue derived from the distillation of petroleum, continuously withdrawing purified iron from the base of the pool and regulating the rate of flow of iron from the base of the pool by regulating the angle of inclination of the tilting ladle.

IRVING E. MUSKAT.